(12) United States Patent
Zhang

(10) Patent No.: US 9,350,426 B2
(45) Date of Patent: May 24, 2016

(54) SELECTING A RECEIVING ANTENNA IN A WIRELESS LOCAL AREA NETWORK

(71) Applicant: Hangzhou H3C Technologies Co., Ltd., Hangzhou, Zhejiang (CN)

(72) Inventor: Weiwei Zhang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 91 days.

(21) Appl. No.: 14/358,807

(22) PCT Filed: Jan. 18, 2013

(86) PCT No.: PCT/CN2013/000058
§ 371 (c)(1),
(2) Date: May 16, 2014

(87) PCT Pub. No.: WO2013/107289
PCT Pub. Date: Jul. 25, 2013

(65) Prior Publication Data
US 2014/0313924 A1    Oct. 23, 2014

(30) Foreign Application Priority Data

Jan. 20, 2012 (CN) .......................... 2012 1 0018976

(51) Int. Cl.
*H04B 7/04* (2006.01)
*H04B 7/08* (2006.01)
(Continued)

(52) U.S. Cl.
CPC ............... *H04B 7/04* (2013.01); *H04B 7/082* (2013.01); *H04B 7/0874* (2013.01); *H04W 24/08* (2013.01); *H04W 84/12* (2013.01); *H04W 88/08* (2013.01)

(58) Field of Classification Search
CPC ........ H04B 7/04; H04W 24/08; H04W 84/12; H04W 88/08
See application file for complete search history.

(56) References Cited

U.S. PATENT DOCUMENTS 6,085,076 A     7/2000 Lindsay et al.
7,120,468 B1 * 10/2006 Wilhoyte et al. ........... 455/562.1
(Continued)

FOREIGN PATENT DOCUMENTS

CN      1937443     3/2007
CN      1864338     6/2011
(Continued)

OTHER PUBLICATIONS

International Search Report and Written Opinion dated Mar. 28, 2013 issued on PCT Patent Application No. PCT/CN2013/000058 dated Jan. 18, 2013, The State Intellectual Property Office, P.R. China.
(Continued)

*Primary Examiner* — Albert T Chou
(74) *Attorney, Agent, or Firm* — Hewlett Packard Enterprise Patent Department

(57) ABSTRACT

The disclosure involves selecting a receiving antenna in a wireless local area network, comprises: testing each antenna in an antenna array to obtain an antenna quality parameter of each antenna corresponding to a client Station, and determining an optimal receiving antenna corresponding to said Station according to the antenna quality parameter of each antenna corresponding to the Station; setting the optimal receiving antenna corresponding to said Station as the receiving antenna upon receiving a notification transmission message transmitted by said Station.

17 Claims, 1 Drawing Sheet

(51) Int. Cl.
*H04W 24/08* (2009.01)
*H04W 84/12* (2009.01)
*H04W 88/08* (2009.01)

(56) References Cited

U.S. PATENT DOCUMENTS

| | | |
|---|---|---|
| 7,162,261 B1 * | 1/2007 | Yarkosky et al. ............. 455/513 |
| 2005/0095987 A1 * | 5/2005 | Lyons et al. ............... 455/67.13 |
| 2005/0266903 A1 | 12/2005 | Masaki |
| 2006/0258402 A1 * | 11/2006 | Guillouard et al. ........ 455/562.1 |
| 2008/0075190 A1 * | 3/2008 | Lin ............................... 375/267 |
| 2008/0088518 A1 * | 4/2008 | Charash et al. ............... 343/757 |
| 2009/0201205 A1 | 8/2009 | Catreux-Erceg et al. |
| 2009/0258622 A1 * | 10/2009 | Ruijter ....................... 455/226.3 |
| 2010/0215111 A1 * | 8/2010 | Filipovic et al. .............. 375/267 |
| 2010/0246547 A1 | 9/2010 | Yoon |
| 2012/0021702 A1 * | 1/2012 | Liu et al. ..................... 455/90.2 |

FOREIGN PATENT DOCUMENTS

| | | |
|---|---|---|
| CN | 102324957 | 1/2012 |
| CN | 102571182 | 7/2012 |

OTHER PUBLICATIONS

Extended European Search Report dated Sep. 29, 2015, EP Patent Application No. 13738387.3 dated Jan. 18, 2013, European Patent Office.

* cited by examiner

SELECTING A RECEIVING ANTENNA IN A WIRELESS LOCAL AREA NETWORK

CROSS-REFERENCE TO RELATED APPLICATIONS

The present application is a 371 application of International Application No. PCT/CN2013/000058 filed on Jan. 18, 2013 and entitled "Selecting A Receiving Antenna In A Wireless Local Area Network," which claims the benefit of Chinese Patent Application No. 201210018976.2 filed on Jan. 20, 2012.

BACKGROUND

As a Wireless Local Area Network WLAN is having improved requirements on the throughput, the beamforming technique that can improve the signal quality gradually becomes popular in the WLAN.

The beamforming technique is a universal signal processing technique for controlling the propagation direction and the reception of RF signals. The conventional Beamforming techniques, e.g. the Beamforming technique specified in the 802.11n protocol, mainly concern concentrating energy to a target user by adjusting the signal transmission parameters, thereby increasing the demodulating signal-to-noise ratio of the target user and increasing the throughput. The Beamforming technique specified in the 802.11n protocol needs support from client Stations, and in order to enable the Stations to also take advantage of the Beamforming technique to some extent, in the wireless access point (AP) of the WLAN, a specific antenna is usually selected for each Station from an antenna array having a plurality of antennae using a software algorithm, and a specific waveform needed by said Station is formed using the selected antenna.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

As used herein, the term "includes" means includes but not limited to, the term "including" means including but not limited to. The term "based on" means based at least in part on. In addition, the terms "a" and "an" are intended to denote at least one of a particular element.

In the following, certain examples are described in detail with reference to the drawings.

Figure 1:
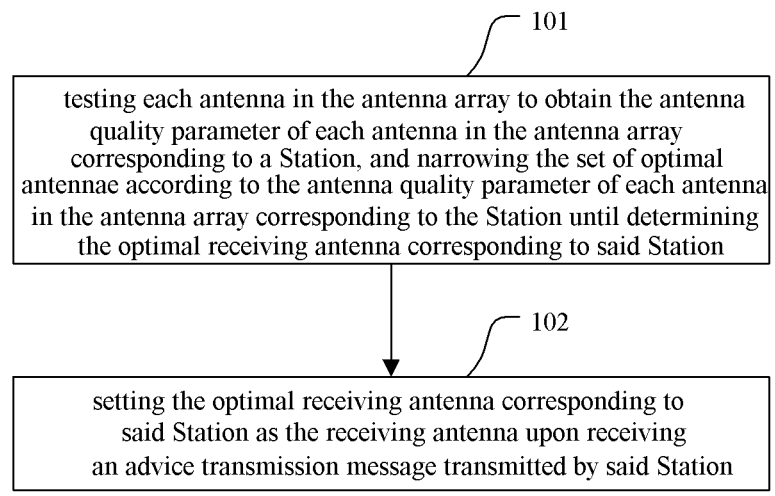
FIG. 1 is a flow chart of a method for selecting a receiving antenna from an antenna array in a wireless local area network according to an example.

FIG. 1 is a flow chart of a method for selecting a receiving antenna from an antenna array in a wireless local area network according to an example.

At block 101, said method comprises testing each antenna in the antenna array to obtain an antenna quality parameter of each antenna in the antenna array corresponding to a client Station, and narrowing a set of optimal antennae according to the antenna quality parameter of each antenna in the antenna array corresponding to the Station until an optimal receiving antenna corresponding to said Station is determined.

Here, testing each antenna in an antenna array is performed in such a way as that for any Station, try to use each antenna in the antenna array to receive a message transmitted by said Station, and obtain the antenna quality parameter of each antenna corresponding to said Station during reception of the message, said antenna quality parameter may include one of or any combination of the following: Error Vector Magnitude (EVM), number of Cyclic Redundancy Check (CRC) errors, transmission quality, and Received Signal Strength Indication (RSSI). Wherein the transmission quality refers to the message transmission quality when said antenna is used as a transmission antenna to transmit messages to the Station, which mainly depends on factors like the transmission packet loss rate and the RSSI during transmission of messages, and the message transmission quality of said antenna corresponding to said Station may be computed according to an algorithm for selecting a. transmission antenna.

In fact, as for contents actually included in the antenna quality parameter, a set of optimal antennae can be selected corresponding to each parameter, then an intersecting computation is performed on the sets of optimal antennae corresponding to each of the parameters to obtain a set of optimal antennae in which each of the parameters is optimal, and the antennae in said obtained set of optical antennae are optimal over other antennae in the antenna array.

For example, suppose that the antenna quality parameter includes the EVM and number of CRC errors; and each of the antennae in the antenna array has been tested to obtain the antenna quality parameter of each antenna corresponding to a client Station, then 30% (or other proportions as obtained by practical experiences) of the antennae having the smallest EVM can be selected according to the antenna quality parameter of each antenna corresponding to said Station to form a set of optimal antennae corresponding to the EVM; 20% (or other proportions as obtained by practical experiences) of the antennae having the least number of CRC errors can be selected to form a set of optimal antennae corresponding to the number of CRC errors; thus by performing an intersecting computation on said two sets, a set of optimal antennae having smaller EVM and less number of CRC errors can be obtained, and with respect to said Station, any antenna in said set of optimal antennae will have a better reception quality when receiving messages transmitted by said Station than other antennae in the antenna array, and thus an antenna from said set of optimal antennae can be selected as the receiving antenna corresponding to said Station.

It can be seen from the above that the method of determining the optimal antenna corresponding to said Station according to the antenna quality parameter of each antenna in the antenna array corresponding to said Station can specifically be as follows: when the antenna quality parameter includes the EVM, selecting antennae of a first preset proportion with the smallest EVM to form a first set; when the antenna quality parameter includes the number of CRC errors, selecting antennae of a second preset proportion with the least number of CRC errors to form a second set; when the antenna quality parameter includes the transmission quality, selecting antennae of a third preset proportion with the highest transmission quality to form a third set; when the antenna quality parameter includes the RSSI, selecting antennae of a fourth preset proportion with the largest RSSI to form a fourth set; performing intersecting computation on one of or any combination of said first set, second set, third set and fourth set according to the contents actually included in the antenna quality parameter to obtain a set of optimal antennae, and selecting one antenna from the set of optimal antennae as the optimal receiving antenna corresponding to said Station. Wherein, the method of selecting one antenna as the optimal antenna corresponding to said Station can be achieved for example, by selecting randomly or ranking according to the importance of the indexes in the antenna quality parameter and the magnitudes of the corresponding values thereof.

Said selecting antennae of a first preset proportion with the smallest EVM is to select antennae of a first preset proportion in an order of the EVMs of the antennae being from small to large. Said selecting antennae of a second preset proportion with the least number of CRC errors is to select antennae of a second preset proportion in an order of the number of CRC errors of the antennae being from small to large. Said selecting antennae of a third preset proportion with the highest transmission quality is to select antennae of a third preset proportion in an order of the transmission quality of the antennae being from high to low. Said selecting antennae of a fourth preset proportion with the largest RSSI is to select antennae of a fourth preset proportion in an order of the RSSIs of the antennae being from large to small.

In practical application, when using said EVM, number of CRC errors, transmission quality and RSSI to evaluate the quality of an antenna for a certain Station, they are ranked by importance as EVM, number of CRC errors, transmission quality and RSSI, that is to say, the EVM can best evaluate the quality of an antenna for a certain Station, the smaller the EVM is, the larger the possibility of the antenna being optimal for said Station is. Therefore, with respect to the above-mentioned first preset proportion, second preset proportion, third preset proportion and four preset proportion, the values thereof can be from large to small so as to increase the accuracy of selecting the optimal receiving antenna, for example, the values of the first preset proportion, second preset proportion, third preset proportion and four preset proportion are 30%, 20%, 20% and 10%, respectively. However, it is not necessarily that the values of the first preset proportion, second preset proportion, third preset proportion and four preset proportion must be from large to small, for example, the values of the first preset proportion, second preset proportion, third preset proportion and four preset proportion are 15%, 20%, 30% and 10%, respectively.

In the above-mentioned process of determining the optimal receiving antenna, when there are a lot of antennae in the antenna array, the set of optimal antennae obtained by performing the intersecting computation once may still include many antennae. In this case, the antennae in the set of optimal antennae may be tested again to obtain the antenna quality parameter of each antenna corresponding to said Station in the set of optimal antennae, and then the optimal receiving antenna corresponding to said Station is determined according to the antenna quality parameter of each antenna corresponding to said Station in the set of optimal antennae.

Hence, after obtaining the set of optimal antennae by performing intersecting computation on one of or any combination of said first set, second set, third set and fourth set, and before selecting one antenna from the set of optimal antennae as the optimal antenna corresponding to said Station, said method further comprises: determining whether a ratio between a total number of antennae in the set of optimal antennae and a total number of antennae in the antenna array is greater than a first preset value (e.g. 0.05 as determined according to the practical need), if yes, testing each of the antennae in the set of optimal antennae again to obtain the antenna quality parameter of each of the antennae in the set of optimal antennae corresponding to the client Station, and narrowing the set of optimal antennae according to the antenna quality parameter of each of the antennae in the set of optimal antennae corresponding to the Station until the optimal receiving antenna corresponding to said Station is determined; if no, selecting one antenna from the set of optimal antennae as the optimal receiving antenna corresponding to said Station.

The process from testing all antennae in a set of antennae with respect to a certain Station to determining the optimal receiving antenna corresponding to said Station can be repeated for several times, and each time the range of the set of antennae tested is narrowed down until the set of optimal antennae is found which contains less but optimal antennae, then one antenna is selected from said set of optimal antennae as the optimal receiving antenna corresponding to said Station.

At this block 101, after determining the optimal receiving antenna corresponding to said Station, a corresponding relation between said Station and said determined optimal receiving antenna needs to be stored in such a manner as Station identifier, optimal antenna identifier, wherein, the Station identifier can be represented by the MAC address of said Station, and the optimal antenna identifier can be represented by the serial number of said antenna. Thus when a message transmitted by said Station is received, the corresponding optimal receiving antenna can be searched for according to the MAC address of the message.

At block 102, said method comprises setting the optimal receiving antenna corresponding to said Station as the receiving antenna upon receiving a notification transmission message transmitted by said Station.

The notification transmission message herein can be a Request to Send (RTS) message or a NULL Data message, depending on the system configuration of the Station that transmits the message. If said Station needs to transmit a RTS message first after contending a channel (the RTS message being for preparing channels for messages to be transmitted subsequently), then the RTS message can be used as the notification transmission message of said Station; if said Station does not need to transmit a RTS message after contending a channel, it may transmit a NULL Data as the notification transmission message. By transmitting the notification transmission message, the AP is enabled to learn that said Station is going to transmit a message, and thus it can set the optimal receiving antenna corresponding to said Station as the receiving antenna to receive the message by using the optimal receiving antenna corresponding to said Station, as a result, the uplink traffic can be made to reach the maximum throughput.

In practical application, different Stations may correspond to different optimal receiving antennae. Moreover, when a transmission request message from a certain Station is received, the optimal receiving antenna corresponding to said Station may not have been determined yet, for example, when said Station just goes on line, no antenna testing has been performed for said Station yet, the optimal receiving antenna corresponding to said Station can certainly not be determined, in this case, a default receiving antenna can be set as the receiving antenna for said Station. Therefore, at this block, after receiving the notification transmission message transmitted by said Station, and before setting the optimal receiving antenna corresponding to said Station as the receiving antenna, the optimal receiving antenna corresponding to said Station is searched for first, if it is found, the optimal receiving antenna corresponding to said Station is set as the receiving antenna, if it is not found, a default receiving antenna is set as the receiving antenna. The AP, when receiving a message, will estimate the channel according to a Long Training Sequence (LTF) in a Physical Layer Convergence Protocol (PLCP) head of the message to generate a channel parameter, so if the optimal receiving antenna is set before completion of the reception of the message that is currently being received, the new receiving antenna may not be suitable for the channel parameter of the channel estimation, as a result, a failure may occur in the reception of the message that is currently being received. Therefore, for any Station, the AP can set the optimal receiving antenna corresponding to said Station as the receiving antenna only after determining that the notification transmission message it had transmitted has been received.

In practical application, when the traffic of a Station are mostly uplink traffic, more messages from said Station are received, so when calculating the optimal receiving antenna, there are more training messages that are used to indicate the transmission qualities of the antennae, in this case, the calculated optimal receiving antenna would be more accurate, and the calculated optimal receiving antenna can be set as the receiving antenna. When the traffic of a Station are mostly downlink traffic, more messages are transmitted from the AP to said Station, so when calculating the optimal transmission antenna, there are more training messages that are used to indicate the transmission qualities of the antennae, in this case, the calculated optimal transmission antenna would be more accurate, and the optimal transmission antenna obtained using the transmission antenna selection algorithm can be directly used as the receiving antenna in view that the uplink and downlink are substantially symmetric. Therefore, after finding the optimal receiving antenna corresponding to said Station and before setting the optimal antenna corresponding to said Station as the receiving antenna, said method may further comprise: determining whether a ratio between an uplink traffic and a downlink traffic of said Station in a preset time is greater than a second preset value (determined according to experiences), if yes, setting the optimal receiving antenna corresponding to said Station as the receiving antenna; otherwise, downlink traffic of the Station being predominant and setting the optimal transmission antenna corresponding to said Station as the receiving antenna.

The optimal receiving antenna corresponding to each Station can be stored in a hardware cache, and the process of the AP, upon receiving a notification transmission message of a Station, searching for the optimal receiving antenna corresponding to said Station and setting said optimal receiving antenna corresponding to said Station as the receiving antenna can be implemented using a hardware chip so as to increase the speed of switching between the receiving antennae.

In the example shown in FIG. 1, after setting the optimal receiving antenna corresponding to said Station as the receiving antenna, there is also a block of receiving a message from said Station using the set receiving antenna.

In practical application, change of environment will influence the reception and transmission qualities of an antenna, and for any Station, the reception quality of its corresponding optimal receiving antenna will also change with the change of environment, so when using the optimal receiving antenna to receive the message transmitted by said Station, the reception quality of said optimal receiving antenna needs to be tested to obtain the current antenna quality parameter of said optimal receiving antenna, if the antenna quality parameter of said optimal receiving antenna corresponding to said Station varies at a larger amplitude, the optimal receiving antenna needs to be reselected when the reception quality deteriorates.

Hence, when receiving the messages transmitted by said Station using the set receiving antenna, the antenna quality parameter of said receiving antenna corresponding to said Station also needs to be obtained, which specifically includes: when the antenna quality parameter includes the EVM, obtaining the EVM of said receiving antenna corresponding to said Station and recording it as first value; when the antenna quality parameter includes the number of CRC errors, obtaining the number of CRC errors of said receiving antenna corresponding to said Station and recording it as second value; when the antenna quality parameter includes the transmission quality, obtaining the transmission quality of said receiving antenna corresponding to said Station and recording it as third value; when the antenna quality parameter includes the RSSI, obtaining the RSSI of said receiving antenna corresponding to said Station and recording it as fourth value; then determining whether an amplitude of variation of any one of said first value, second value, third value and fourth value exceeds a third preset value (determined according to experience) according to the contents actually included in the antenna quality parameter, if yes, testing each of the antennae in the antenna array again to obtain the antenna quality parameter of each of the antennae in the antenna array corresponding to the Station, and narrowing the set of optimal antennae again according to the antenna quality parameter of each of the antennae in the antenna array corresponding to the Station until the optimal receiving antenna corresponding to said Station is determined.

The above describes in detail the method of selecting a receiving antenna from an antenna array in a wireless local area network according to an example, meanwhile, the disclosure also provides an apparatus for selecting a receiving antenna from an antenna array in a wireless local area network according to an example.

Figure 2:
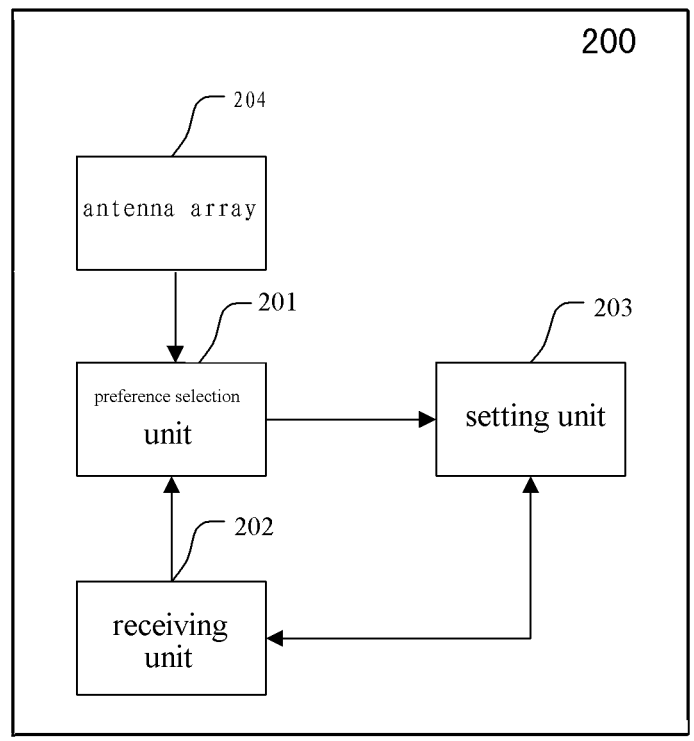
FIG. 2 is a structural diagram of an apparatus for selecting a receiving antenna from an antenna array in a wireless local area network according to an example.

FIG. 2 is a structural diagram of an apparatus 200 for selecting a receiving antenna from an antenna array 204 in a wireless local area network according to an example. Said apparatus 200 comprises: a preference selection unit 201, a receiving unit 202 and a setting unit 203.

Said preference selection unit 201 is to test each antenna in the antenna array to obtain antenna quality parameter of each antenna in the antenna array corresponding to a client Station, and narrow a set of optimal antennae according to the antenna quality parameter of each antenna in the antenna array corresponding to the Station until the optimal receiving antenna corresponding to said Station is determined.

Said receiving unit 202 is to receive a notification transmission message transmitted by said Station.

Said setting unit 203 is to set the optimal receiving antenna corresponding to said Station as the receiving antenna upon receiving unit 202 receiving the notification transmission message transmitted by said Station.

Said antenna quality parameter includes one of or any combination of the following: Error Vector Magnitude EVM, number of Cyclic Redundancy Check CRC errors, transmission quality, and Received Signal Strength Indication RSSI.

When determining the optimal receiving antenna corresponding to said Station according to the antenna quality parameter of each antenna corresponding to the Station, said preference selection unit 201 is to:

when the antenna quality parameter includes the EVM, select antennae of a first preset proportion with the smallest EVM to form a first set; when the antenna quality parameter includes the number of CRC errors, select antennae of a second preset proportion with the least number of CRC errors to form a second set; when the antenna quality parameter includes the transmission quality, select antennae of a third preset proportion with the highest transmission quality to form a third set; when the antenna quality parameter includes the RSSI, select antennae of a fourth preset proportion with the largest RSSI to form a fourth set;

obtain a set of optimal antennae by performing intersecting computation on one of or any combination of said first set, second set, third set and fourth set according to the contents actually included in the antenna quality parameter, and select one antenna from the set of optimal antennae as the optimal receiving antenna corresponding to said Station.

After obtaining the set of optimal antennae by performing intersecting computation on one of or any combination of said first set, second set, third set and fourth set, and before selecting one antenna from the set of optimal antennae as the optimal antenna corresponding to said Station, said preference selection unit 201 is further to determine whether a ratio between a total number of antennae in the set of optimal antennae and a total number of antennae in the antenna array is greater than a first preset value, if yes, test each of the antennae in the set of optimal antennae again to obtain the antenna quality parameter of each of the antennae in the set of optimal antennae corresponding to the client Station, and narrow the set of optimal antennae according to the antenna quality parameter of each of the antennae in the set of optimal antennae corresponding to the Station until the optimal receiving antenna corresponding to said Station is determined; if no, select one antenna from the set of optimal antenna set as the optimal receiving antenna corresponding to said Station.

Said receiving unit 202 is further to use the receiving antenna set by the setting unit 203 to receive messages transmitted by said Station.

Said preference selection unit 201 is further to: when the antenna quality parameter includes the EVM, obtain the EVM of said receiving antenna corresponding to said Station and record it as a first value; when the antenna quality parameter includes the number of CRC errors, obtain the number of CRC errors of said receiving antenna corresponding to said Station and record it as a second value; when the antenna quality parameter includes the transmission quality, obtain the transmission quality of said receiving antenna corresponding to said Station and record it as a third value; when the antenna quality parameters include the RSSI, obtain the RSSI of said receiving antenna corresponding to said Station and record it as a fourth value; determine whether an amplitude of variation of any one of first value, second value, third value and fourth value exceeds a second preset value according to the contents actually included in the antenna quality parameter, if yes, test each of the antennae in the antenna array again to obtain the antenna quality parameter of each of the antennae in the antenna array corresponding to the client Station, and narrow the set of optimal antennae according to the antenna quality parameter of each of the antennae in the antenna array corresponding to the Station until the optimal receiving antenna corresponding to said Station is determined.

After the receiving unit 202 receiving the notification transmission message transmitted by said Station, and before setting the optimal receiving antenna corresponding to said Station as the receiving antenna, said setting unit 203 is further to search for the optimal receiving antenna corresponding to said Station, if it is found, set the optimal receiving antenna corresponding to said Station as the receiving antenna, if it is not found, set a default receiving antenna as the receiving antenna.

After finding the optimal receiving antenna corresponding to said Station and before setting the optimal receiving antenna corresponding to said Station as the receiving antenna, said setting unit 203 is further to determine whether a ratio between an uplink traffic and a downlink traffic of said Station in a preset time is greater than a third preset value, if yes, setting the optimal receiving antenna corresponding to said Station as the receiving antenna; otherwise, setting the optimal transmission antenna corresponding to said Station as the receiving antenna.

In an example, said apparatus 200 can be a wireless access point including an antenna array 204 comprising a plurality of antennas. When said wireless access point needs to receive message, said wireless access point can select optimal receiving antenna from said antenna array like said apparatus 200, thereby achieving the largest uplink throughput.

The notification transmission message can be a Request to Send (RTS) message or a NULL Data message.

The disclosure can improve throughout of uplink traffic by selecting a receiving antenna in a wireless local area network.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.). The processes, methods and functional units may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

The drawings are merely schematic drawings of an example, and the modules or flows in the drawings are not necessary essential for carrying out the disclosure.

The modules in the device in the examples can be distributed in the device in the examples according to the descriptions of the example, or they can be changed so as to be in one or more devices that are different from that in the examples. The modules in the above examples can be either combined into one module or further divided into several sub-modules.

The above sequential numbers mentioned are only for facilitating description, but they are not used to represent which example is more advantage.

The above description includes examples. Any modification, equivalent substitution and improvement made that are according to the spirit and principle of the examples shall be included in the protection scope.

The invention claimed is:

1. A method for selecting a receiving antenna from an antenna array in a wireless local area network, wherein said method comprises:

testing each antenna in the antenna array to obtain an antenna quality parameter of each antenna corresponding to a client Station; and upon receiving a notification transmission message transmitted by said Station:

searching for an optimal receiving antenna corresponding to said Station;
if the optimal receiving antenna is found:
determining whether a ratio between an uplink traffic and a downlink traffic of said Station in a preset time is greater than a third preset value;
if yes, setting the optimal receiving antenna corresponding to said Station as the receiving antenna;
otherwise, setting an optimal transmission antenna corresponding to said Station as the receiving antenna; and
if the optimal receiving antenna is not found, setting a default receiving antenna as the receiving antenna.

2. The method according to claim 1, wherein said antenna quality parameter includes one of or any combination of the following: Error Vector Magnitude EVM, number of Cyclic Redundancy Check CRC errors, transmission quality, and Received Signal Strength Indication RSSI.

3. The method according to claim 2, wherein said determining an optimal receiving antenna according to said antenna quality parameter comprises:
when the antenna quality parameter includes the EVM, selecting antennae of a first preset proportion with the smallest EVM to form a first set; when the antenna quality parameter includes the number of CRC errors, selecting antennae of a second preset proportion with the least number of CRC errors to form a second set; when the antenna quality parameter includes the transmission quality, selecting antennae of a third preset proportion with the highest transmission quality to form a third set; when the antenna quality parameter includes the RSSI, selecting antennae of a fourth preset proportion with the largest RSSI to form a fourth set;
obtaining a set of optimal antennae by performing intersecting computation on one of or any combination of said first set, second set, third set and fourth set according to the antenna quality parameter, and selecting one antenna from the set of optimal antennae as the optimal receiving antenna corresponding to said Station.

4. The method according to claim 3, wherein after obtaining the set of optimal antennae by performing intersecting computation on one of or any combination of said first set, second set, third set and fourth set, and before selecting one antenna from the set of optimal antennae as the optimal antenna corresponding to said Station, said method further comprises:
determining whether a ratio between a total number of antennae in the set of optimal antennae and a total number of antennae in the antenna array is greater than a first preset value,
if yes, testing each of the antennae in the set of optimal antennae again to obtain the antenna quality parameter of each of the antennae in the set of optimal antennae corresponding to the client Station, and narrowing the set of optimal antennae according to the antenna quality parameter of each of the antennae in the set of optimal antennae corresponding to the Station until the optimal receiving antenna corresponding to said Station is determined;
if no, selecting one antenna from the set of optimal antennae as the optimal receiving antenna corresponding to said Station.

5. The method according to claim 3, wherein said method further comprises:
receiving message transmitted by said Station using the set receiving antenna;
when the antenna quality parameter includes the EVM of the message, obtaining the EVM of said receiving antenna corresponding to said Station and recording it as a first value; when the antenna quality parameter includes the number of CRC errors, obtaining the number of CRC errors of said receiving antenna corresponding to said Station and recording it as a second value; when the antenna quality parameter includes the transmission quality, obtaining the transmission quality of said receiving antenna corresponding to said Station and recording it as a third value; when the antenna quality parameter includes the RSSI, obtaining the RSSI of said receiving antenna corresponding to said Station and recording it as a fourth value;
determining whether an amplitude of variation of any one of said first value, second value, third value and fourth value exceeds a second preset value according to the antenna quality parameter,
if yes, testing each of the antennae in the antenna array again to obtain the antenna quality parameter of each of the antennae in the antenna array corresponding to the client Station, and narrowing the set of optimal antennae according to the antenna quality parameter of each of the antennae in the antenna array corresponding to the Station until the optimal receiving antenna corresponding to said Station is determined.

6. An apparatus for selecting a receiving antenna from an antenna array in a wireless local area network, wherein said apparatus comprises: a preference selection unit, a receiving unit and a setting unit;
said preference selection unit is to:
test each antenna in the antenna array to obtain an antenna quality parameter of each antenna in the antenna array corresponding to a client Station, wherein said antenna quality parameter includes one of or any combination of the following: Error Vector Magnitude EVM, number of Cyclic Redundancy Check CRC errors, transmission quality, and Received Signal Strength Indication RSSI;
when the antenna quality parameter includes the EVM, select antennae of a first preset proportion with the smallest EVM to form a first set; when the antenna quality parameter includes the number of CRC errors, select antennae of a second preset proportion with the least number of CRC errors to form a second set; when the antenna quality parameter includes the transmission quality, select antennae of a third preset proportion with the highest transmission quality to form a third set; when the antenna quality parameter includes the RSSI, select antennae of a fourth preset proportion with the largest RSSI to form a fourth set; and
obtain a set of optimal antennae by performing intersecting computation on one of or any combination of said first set, second set, third set and fourth set according to the antenna quality parameter, and select one antenna from the set of optimal antennae as the optimal receiving antenna corresponding to said Station;
said receiving unit is to receive a notification transmission message transmitted by said Station;
said setting unit is to set the optimal receiving antenna corresponding to said Station as the receiving antenna upon the receiving unit receiving a notification transmission message transmitted by said Station.

7. The apparatus according to claim 6, wherein after said preference selection unit is to obtain the set of optimal antennae by performing intersecting computation on one of or any combination of said first set, second set, third set and fourth set, and before said preference selection unit is to select one antenna from the set of optimal antennae as the optimal antenna corresponding to said Station, said preference selection unit is further to determine whether a ratio between a total number of antennae in the set of optimal antennae and a total number of antennae in the antenna array is greater than a first preset value, if yes, test each of the antennae in the set of optimal antennae again to obtain the antenna quality parameter of each of the antennae in the set of optimal antennae corresponding to the client Station, and narrow the set of optimal antennae according to the antenna quality parameter of each of the antennae in the set of optimal antennae corresponding to the Station until the optimal receiving antenna corresponding to said Station is determined; if no, select one antenna from the set of optimal antenna as the optimal receiving antenna corresponding to said Station.

8. The apparatus according to claim 6, wherein
said receiving unit is further to use the receiving antenna set by the setting unit to receive messages transmitted by said Station;
said preference selection unit is further to:
when the antenna quality parameter includes the EVM, obtain the EVM of said receiving antenna corresponding to said Station and record it as a first value; when the antenna quality parameter includes the number of CRC errors, obtain the number of CRC errors of said receiving antenna corresponding to said Station and record it as a second value; when the antenna quality parameter includes the transmission quality, obtain the transmission quality of said receiving antenna corresponding to said Station and record it as a third value; when the antenna quality parameters include the RSSI, obtain the RSSI of said receiving antenna corresponding to said Station and record it as a fourth value;
determine whether an amplitude of variation of any one of said first value, second value, third value and fourth value exceeds a second preset value according to the antenna quality parameter, if yes, test each of the antennae in the antenna array again to obtain the antenna quality parameter of each of the antennae in the antenna array corresponding to the client Station, and narrow the set of optimal antennae according to the antenna quality parameter of each of the antennae in the antenna array corresponding to the Station until the optimal receiving antenna corresponding to said Station is determined.

9. The apparatus according to claim 6, wherein after the receiving unit receiving the notification transmission message transmitted by said Station, and before setting the optimal receiving antenna corresponding to said Station as the receiving antenna, said setting unit is further to search for the optimal receiving antenna corresponding to said Station, if it is found, set the optimal receiving antenna corresponding to said Station as the receiving antenna, if it is not found, set a default receiving antenna as the receiving antenna.

10. The apparatus according to claim 9, wherein after finding the optimal receiving antenna corresponding to said Station and before setting the optimal receiving antenna corresponding to said Station as the receiving antenna, said setting unit is further to determine whether a ratio between an uplink traffic and a downlink traffic of said Station in a preset time is greater than a third preset value, if yes, set the optimal receiving antenna corresponding to said Station as the receiving antenna; otherwise, set the optimal transmission antenna corresponding to said Station as the receiving antenna.

11. The apparatus according to claim 6, wherein the apparatus is a wireless access point including said antenna array.

12. A method for selecting a receiving antenna from an antenna array in a wireless local area network, wherein said method comprises:
testing each antenna in the antenna array to obtain an antenna quality parameter of each antenna corresponding to a client Station, wherein said antenna quality parameter includes one of or any combination of the following: Error Vector Magnitude EVM, number of Cyclic Redundancy Check CRC errors, transmission quality, and Received Signal Strength Indication RSSI;
determining an optimal receiving antenna according to said antenna quality parameter, wherein determining the optimal receiving antenna comprises:
when the antenna quality parameter includes the EVM, selecting antennae of a first preset proportion with the smallest EVM to form a first set; when the antenna quality parameter includes the number of CRC errors, selecting antennae of a second preset proportion with the least number of CRC errors to form a second set; when the antenna quality parameter includes the transmission quality, selecting antennae of a third preset proportion with the highest transmission quality to form a third set; when the antenna quality parameter includes the RSSI, selecting antennae of a fourth preset proportion with the largest RSSI to form a fourth set; and
obtaining a set of optimal antennae by performing intersecting computation on one of or any combination of said first set, second set, third set and fourth set according to the antenna quality parameter, and selecting one antenna from the set of optimal antennae as the optimal receiving antenna corresponding to said Station; and
setting the optimal receiving antenna corresponding to said Station as the receiving antenna upon receiving a notification transmission message transmitted by said Station.

13. The method according to claim 12, wherein after obtaining the set of optimal antennae by performing intersecting computation on one of or any combination of said first set, second set, third set and fourth set, and before selecting one antenna from the set of optimal antennae as the optimal antenna corresponding to said Station, said method further comprises:
determining whether a ratio between a total number of antennae in the set of optimal antennae and a total number of antennae in the antenna array is greater than a first preset value,
if yes, testing each of the antennae in the set of optimal antennae again to obtain the antenna quality parameter of each of the antennae in the set of optimal antennae corresponding to the client Station, and narrowing the set of optimal antennae according to the antenna quality parameter of each of the antennae in the set of optimal antennae corresponding to the Station until the optimal receiving antenna corresponding to said Station is determined;
if no, selecting one antenna from the set of optimal antennae as the optimal receiving antenna corresponding to said Station.

14. The method according to claim 12, wherein said method further comprises:
receiving message transmitted by said Station using the set receiving antenna;
when the antenna quality parameter includes the EVM of the message, obtaining the EVM of said receiving antenna corresponding to said Station and recording it as a first value; when the antenna quality parameter includes the number of CRC errors, obtaining the number of CRC errors of said receiving antenna corresponding to said Station and recording it as a second value; when the antenna quality parameter includes the transmission quality, obtaining the transmission quality of said receiving antenna corresponding to said Station and recording it as a third value; when the antenna quality parameter includes the RSSI, obtaining the RSSI of said receiving antenna corresponding to said Station and recording it as a fourth value;

determining whether an amplitude of variation of any one of said first value, second value, third value and fourth value exceeds a second preset value according to the antenna quality parameter, if yes, testing each of the antennae in the antenna array again to obtain the antenna quality parameter of each of the antennae in the antenna array corresponding to the client Station, and narrowing the set of optimal antennae according to the antenna quality parameter of each of the antennae in the antenna array corresponding to the Station until the optimal receiving antenna corresponding to said Station is determined.

15. The method according to claim 12, wherein after receiving the notification transmission message transmitted by said Station, and before setting the optimal receiving antenna corresponding to said Station as the receiving antenna, said method further comprises:

searching for the optimal receiving antenna corresponding to said Station;

if it is found, setting the optimal receiving antenna corresponding to said Station as the receiving antenna;

if it is not found, setting a default receiving antenna as the receiving antenna.

16. The method according to claim 15, wherein after finding the optimal receiving antenna corresponding to said Station and before setting the optimal receiving antenna corresponding to said Station as the receiving antenna, said method further comprises:

determining whether a ratio between an uplink traffic and a downlink traffic of said Station in a preset time is greater than a third preset value;

if yes, setting the optimal receiving antenna corresponding to said Station as the receiving antenna;

otherwise, setting the optimal transmission antenna corresponding to said Station as the receiving antenna.

17. The method according to claim 12, wherein said antenna array is associated with a wireless access point.

\* \* \* \* \*